United States Patent [19]
Goode et al.

[11] 3,781,472
[45] Dec. 25, 1973

[54] DIGITAL DATA CIPHERING TECHNIQUE

[75] Inventors: George E. Goode, Richardson; Barrie O. Morgan; Kenneth M. Branscome, both of Dallas, all of Tex.

[73] Assignee: Datotek, Inc., Dallas, Tex.

[22] Filed: Apr. 15, 1971

[21] Appl. No.: 134,319

[52] U.S. Cl. .................................................. 178/22
[51] Int. Cl. ........................... H04l 9/04, H04k 1/00
[58] Field of Search ....................................... 178/22

[56] References Cited

UNITED STATES PATENTS

| | | | |
|---|---|---|---|
| 2,951,120 | 8/1960 | Dingley, Jr. | 178/22 |
| 3,522,374 | 7/1970 | Abrahamsen et al. | 178/22 |
| 2,993,089 | 7/1961 | Negri | 178/22 |
| 2,898,402 | 8/1959 | Cory et al. | 178/22 |
| 2,690,475 | 9/1954 | Gaul et al. | 178/22 |
| 2,897,268 | 7/1959 | Bacon et al. | 178/22 |
| 2,406,829 | 9/1946 | Haglund | 178/22 |
| 3,546,380 | 12/1970 | Sturzinger | 178/22 |

OTHER PUBLICATIONS

"Error-Correcting Codes," W. Wesley Peterson, 1961, M.I.T. Press, P. 107, 108, 118, 119.

"An Acquirable Code," Edwin Weiss, Lincoln Laboratory of M.I.T., July 9, 1962, P. 3-4.

"Introduction to Linear Shift Register Generated Sequences," T. G. Birdsall et al., October 1958, University of Michigan.

*Primary Examiner*—Benjamin A. Borchelt
*Assistant Examiner*—H. A. Birmiel
*Attorney*—Richards, Harris & Hubbard

[57] ABSTRACT

The specification discloses a ciphering system for providing security to digital transmission. To encode with the system, a clear text signal is clocked through a binary counter for a number of steps determined by a limit signal derived by a pseudorandom digital signal. To prevent transmission of clear text in case of a malfunction of the system, the clear text is compared with the ciphered output text and an alarm indication is generated upon correspondence of the clear text and the ciphered text for a predetermined number of digital bits. The alarm circuitry is checked and is required to be operative before the ciphering system may be operated. Speed trap circuitry prevents the system from being operated above a preselected frequency to reduce the possibility of breakdown of the system code by high speed analyzation procedures.

21 Claims, 9 Drawing Figures

INVENTORS:
BARRIE O. MORGAN
KENNETH M. BRANSCOME
GEORGE E. GOODE

Richards, Harris & Hubbard
ATTORNEYS

INVENTORS:
BARRIE O. MORGAN
KENNETH M. BRANSCOME
GEORGE E. GOODE

Richards, Harris & Hubbard
ATTORNEYS

INVENTORS:
BARRIE O. MORGAN
KENNETH M. BRANSCOME
GEORGE E. GOODE

Richards, Harris & Hubbard
ATTORNEYS

INVENTORS:
BARRIE O. MORGAN
KENNETH M. BRANSCOME
GEORGE E. GOODE

*Richards, Harris & Hubbard*
ATTORNEYS

DIGITAL DATA CIPHERING TECHNIQUE

FIELD OF THE INVENTION

This invention relates to ciphering digital messages and particularly relates to a cryptographic or privacy technique for enciphering and deciphering teleprinter text.

THE PRIOR ART

A variety of techniques have heretofore been developed for encoding, scrambling or enciphering data. Such prior techniques have included mechanical enciphering techniques, in addition to "table look-up" methods. More recently, enciphering techniques have been developed for automatically encoding digital text. An example of such automatic techniques is disclosed in U. S. Pat. No. 3,522,374, issued July 28, 1970.

Ciphering systems for use with digital data transmission systems such as teleprinter, telex networks and the like have generally heretofore been based upon the modulo-2 addition of a clear text character with a randomly generated key character. In such systems, it is extremely important that the random stream of key characters have as long a cycle as possible. It is also important that accurate synchronization techniques are utilized to properly synchronize the transmitting and receiving ciphering stations. Further, it is important that structure is provided to constantly check the proper operation of such digital ciphering systems to prevent the transmission of clear text in case of failure of the random key stream or other portions of the system.

Moreover, in order to provide a practicial ciphering system for use in industry, a digital ciphering system should be able to selectively operate in either clear or private modes, and such ciphering systems must be able to suppress the transmission of forbidden characters in common digital carriers such as TWX or Telex networks. Precautions should also be taken within such ciphering systems to reduce the probability of unauthorized breakdown of the system code with the use of high speed analyzation systems such as digital computers.

Cryptographic and ciphering systems heretofore developed have not been completely satisfactory with respect to many of the above-described criteria, and have thus not been generally satisfactory for widespread practical use in industrial and commerical applications.

SUMMARY OF THE INVENTION

In accordance with the present invention, a ciphering system is provided which may be selectively operable to send either clear or ciphered digital text, thereby providing flexibility for use in industrial and commercial applications. The present ciphering system is readily adaptable to use with various digital data terminals, and includes circuitry for excluding transmission of forbidden words when used on Telex networks and the like. The present ciphering system is operable to selectively generate any of a large plurality of different ciphering codes, and includes alarm circuitry for indicating malfunction of the ciphering system. Check circuitry is provided to prevent operation of the system in case of malfunction of the alarm system. Speed trap circuitry is provided to reduce the possibility of code breakdown with high speed analyzation techniques.

In accordance with a more specific aspect of the invention, a ciphering system includes circuitry for receiving a first digital word and further includes circuitry for generating a pseudorandom or randomized digital signal. In response to the pseudorandom digital signal, the system generates a limit signal which is applied to a nonlinear cyclic sequential stepping circuit such as a binary counter. The binary counter receives the first digital word and clocks the word through a number of steps determined by the limit signal to thereby generate a second digital word.

In accordance with a more specific aspect of the invention, an enciphering technique is provided which includes circuitry for enciphering clear text digital bits into cipher text digital bits. Circuitry is provided to compare the clear text digital bits with the cipher text digital bits and for generating an alarm indication upon correspondence of the clear text and the ciphered text for a predetermined number of bits.

In accordance with yet another aspect of the invention, a checking circuit for the alarm circuitry of the invention applies identical clear and cipher text signals to the alarm circuit for a predetermined time prior to the initiation of the ciphering mode of operation of the device. An alarm indication is required to enable the device to be placed in the cipher mode of operation to insure that the alarm circuitry is not malfunctioning.

In accordance with yet another aspect of the invention, a detection prevention circuit is provided for a cipher system including a clock for synchronizing the ciphering of digital words. The ciphering operation is inhibited if the frequency of the clock signals is increased above a predetermined magnitude.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENT

Figure 1:
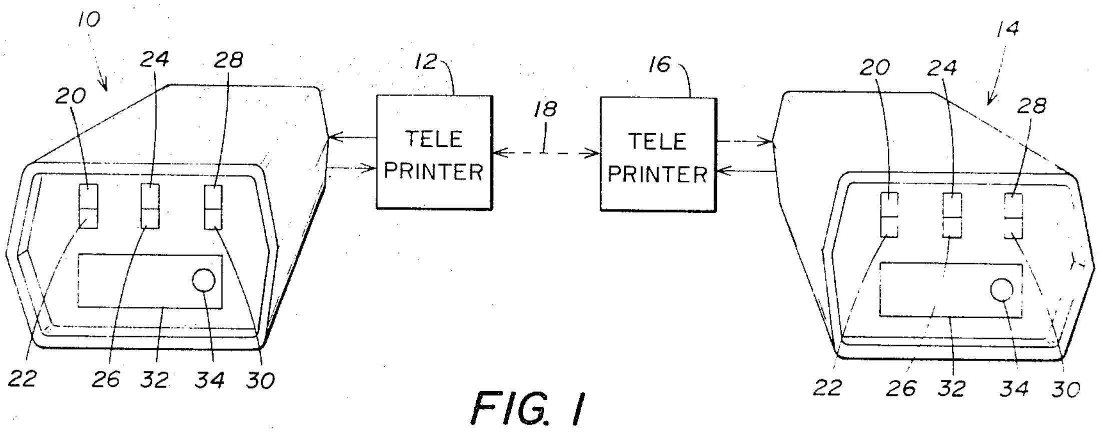
FIG. 1 is a block diagram of a typical installation of the present ciphering system on transmitting and receiving ends of a Telex line.

Referring to FIG. 1, a block diagram of the present ciphering system utilized with a teleprinter network is illustrated. A first ciphering device 10 is interconnected with a conventional teleprinter 12 at one station, while a second identical ciphering device 14 is interconnected with a teleprinter 16 at a remote second location. A Telex or TWX communication channel 18 connects the teleprinters 12 and 16 in the conventional manner. A typical teleprinter unit such as ASR-33 may be utilized with the present invention for operation with 8-level punch paper tape. However, in the preferred embodiment to be described, the teleprinters 12 and 16 operate on 5-level data for transmission on a network such as the Western Union Telex network.

Each of the ciphering devices 10 and 14 includes a Power On button switch 20 and an Alarm Reset button switch 22. An Encode button switch 24 may be depressed to encode data while a Decode button switch 26 may be depressed to decode data. Lamps are disposed behind each of the buttons 20–26 to indicate the operation mode of the device. A light 28 is illuminated when the system is operating in the private or coding mode, while a light 30 is illuminated when a system is operating in the clear or uncoding mode.

In operation of the system, one of the ciphering devices is placed in the encode mode and the other of the devices is placed in the decode mode. Both devices are connected offline from the teleprinters and do not thus interfere with the normal operation of the teleprinters. However, the data transmitted over the communications line 18 will be ciphered and will be unintelligible without the properly synchronized mating ciphering device at the receiving end.

A door 32 is provided on the front of each of the ciphering devices 10 and 14 and includes a lock 34 which must be unlocked by a suitable key before the door 32 may be removed. A plurality of eight position circular thumbwheel switches, not shown, are disposed behind the door 32. The thumbwheel switches may be individually manually rotated to provide any one of a large number of different combinations in order to select the particular code used in the ciphering process.

In operation of the ciphering system shown in FIG. 1, ciphering devices 10 and 14 are interconnected offline to the conventional teleprinters 12 and 16. The teleprinter switch is then placed in the "LOCAL" position and the Power switch 20 of the ciphering device 10 is depressed. At this time, the Power, Encode and Clear lights are illuminated on the cipher unit 10.

The particular code for the day is then entered into the ciphering device 10 by opening door 32 with a special key which is inserted and twisted in the lock 34. The door 32 is removed and the power to ciphering device 10 is cut off in response to the removal of the door. The desired code for the day is entered into the thumbwheel switches or other suitable code entering apparatus behind the door 32. The door 32 is then reinserted and the key is turned to lock the door. The same procedure is also followed at the ciphering device 14 by the operator of that station, and the identical code for the day is entered into the ciphering device.

Assuming a desire to encode a message with the ciphering device 10 and to decode the message with the ciphering device 14, a clear punch tape is prepared on the teleprinter 12 in the conventional manner. The teleprinter 12 is placed in the LOCAL position and the tape punch is turned on. To operate in the Clear mode, the teleprinter is conventionally operated. To then go into the Private mode, a LTRS and QQ are typed on the teleprinter. Five characters, preferably SPACES, are then typed on the teleprinter to step the teleprinter system. During this time, the ciphering device is generating Prime or synchronizing data.

After the private text has been typed, and it is desired to again go into the clear mode, the sequence CR, LF, LTRS and QK is typed on the teleprinter. The clear text is then typed on the teleprinter. If it is then desired to again go to the Private mode of operation, the previously designated Private sequence is typed.

The encoded tape will now be punched by reading the clear tape at full speed into the ciphering device 10 and the encoded tape will thus be simultaneously punched by the teleprinter 12. With the clear tape inserted into the tape reader, the tape reader is turned off by placing the switch in the "STOP" position. The tape punch is turned on and the teleprinter switch is placed in "LOCAL." Several LTRS are punched for a leader. The Power On button 20 and the Encode button 24 are depressed on ciphering device 10, and the Power, Encode and Clear lights are now illuminated. The teleprinter switch is then placed in "LINE" to electrically connect the teleprinter to the cipher unit 10.

The tape reader is turned on by placing the switch in the "START" position and releasing the switch. The tape reader will now read the first tape in the reader and the tape punch will record the clear and private data. As the message changes from Clear to Private and back the ciphering device 10 lights will switch from Clear to Private and back. The page printer will show the clear portion of the text as readable text, while the private portions will be scrambled in unintelligible text. At the beginning of the private text of the message a QQ will be printed.

After the second encoded tape has been prepared, the clear tape is removed from the reader and completely destroyed or filed under the desired security procedures. The encoded tape is removed from the tape punch and is taken from the communications equipment for transmission to the remote station. Alternatively, the encoded tape may be physically hand-carried to the desired designation. In transmission of the tape, via a conventional teleprinter system, the encoded message tape is inserted in a conventional tape reader and the desired receiving station is dialed in the ordinary manner.

When communication is established, the usual preamble is typed and the following message is typed: "PRIVATE MESSAGE FOLLOWS - TURN ON YOUR TAPE PUNCH." When the receiving station acknowledges that its tape punch is on, the tape reader is turned on. The teleprinter 16 will then punch out the encoded tape, complete with leader, trailer, clear and scrambled text. The encoded tape is then torn off and given to the predetermined secure communications operator at the remote terminal.

To decode the cipher message, the secure communications operator ensures that the correct code for the day is set into the ciphering device 14 behind the door 32. The cipher tape is placed in the reader and the ciphering device Power switch 20 is depressed. The Decode button 26 is also depressed, and is illuminated. The teleprinter 16 switch is turned to "LINE" and the tape is mounted on the reader. The tape reader is turned on by placing the switch in the "START" position. The decoded message will now be printed out by the teleprinter 16, with both clear and private portions clearly readable.

If during the above-described procedure the Alarm light 22 comes on, an error in the enciphering or deciphering circuitry is indicated. The Alarm button 22 is then depressed, and the operation is attempted again. If the Alarm indication persists, a malfunction of the system is indicated.

Figure 2:
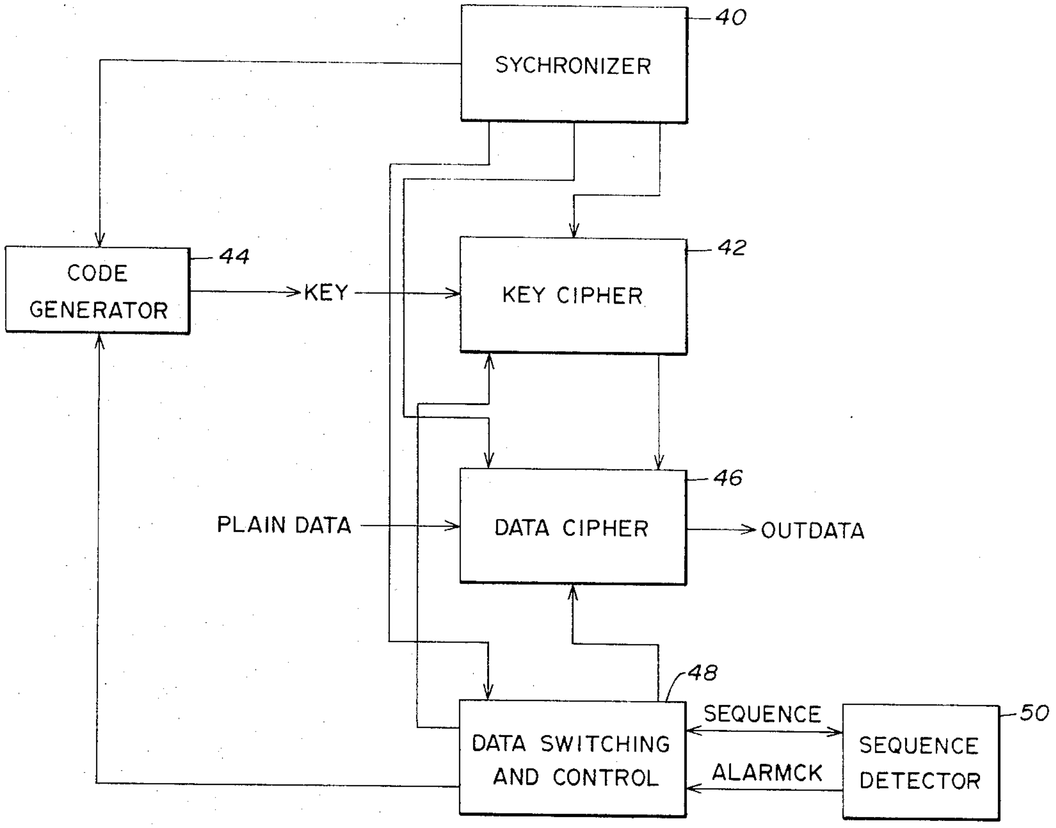
FIG. 2 is a block diagram of the present ciphering unit.

FIG. 2 illustrates a block diagram of the basic sections of the ciphering devices 10 and 14. A synchronizer circuit 40 provides a plurality of synchronizing clock outputs for controlling the operation of the cipher operation. Timing signals from the synchronizer 40 are applied to the key cipher circuitry 42. The key cipher circuitry 42 receives pseudorandom key data from a random code generator 44 which is also controlled by synchronizing pulses from the synchronizer 40. The key cipher circuitry 42 operates in response to the key data to generate a limit signal which is applied to the data cipher circuitry 46. The data cipher circuitry receives plain text data and enciphers the plain text data in response to the limit signal from the key cipher circuitry 42. The enciphered data is then output from the data cipher circuitry 46.

In the decode mode, the data cipher circuitry 46 operates in the reverse manner to receive ciphered data and to output clear text data. A data switching and control circuit 48 provides timing waveforms for controlling the mode of operation of the system. A sequence detector 50 detects the presence of the correct sequence of control characters and checks the operation of the system to insure that clear text is not being generated due to a malfunction of the system. If a malfunction occurs, the sequence detector 50 generates an alarm signal through the data switching and control circuit 48 to place the system in an alarm state.

THE SYNCHRONIZER

Figure 3:
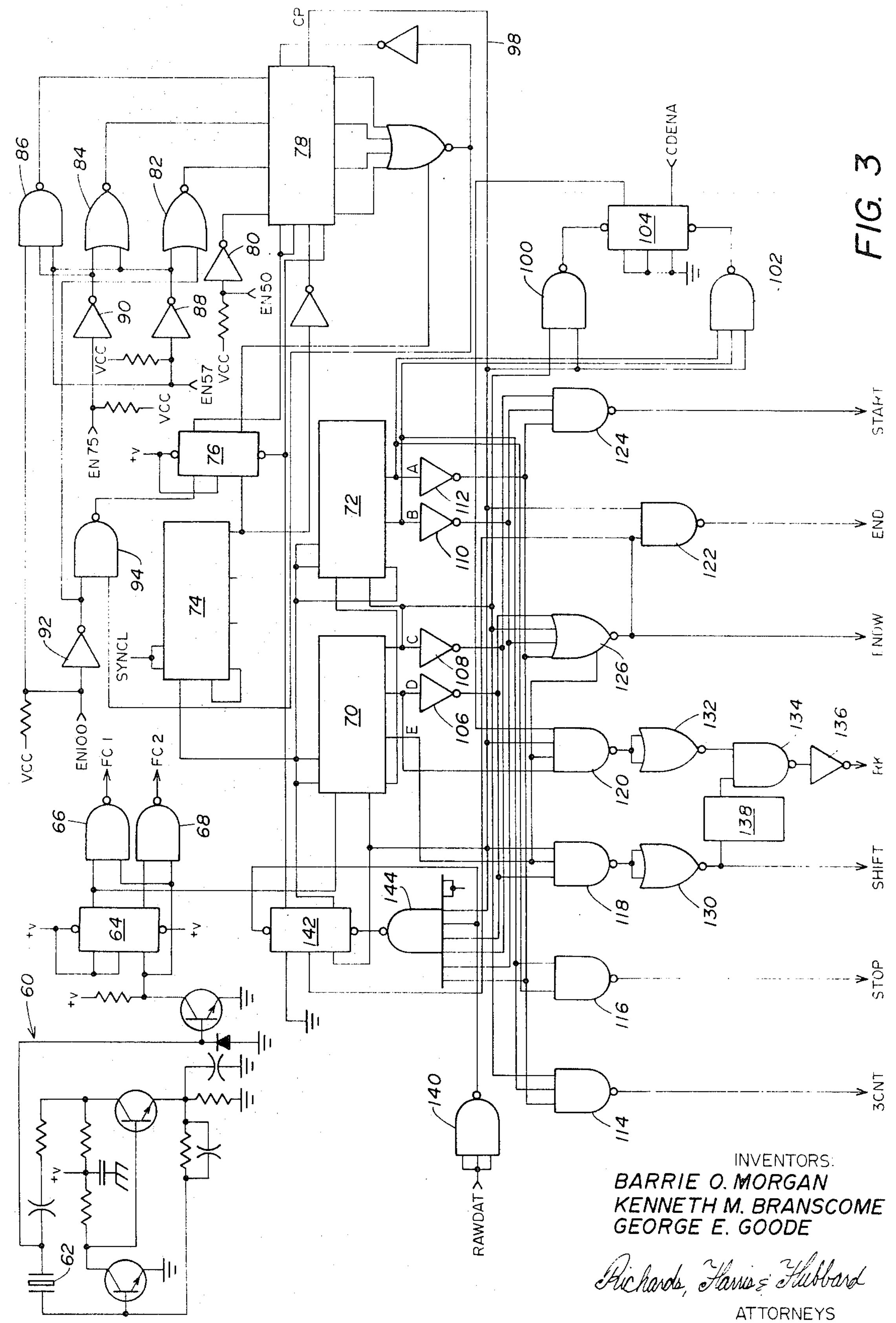
FIG. 3 is a schematic diagram of the synchronizing circuitry of the invention.

Referring to FIG. 3, the schematic circuitry for the synchronizer circuit 40 is illustrated. An oscillator 60 is of conventional design and utilizes a 460.8 KHz crystal 62 for generation of a 460.8 KHz clock signal. The clock signal is applied to the CP terminal of a flipflop 64 which operates as a binary divider to generate a 230.4 KHz clock signal for application to NAND gates 66 and 68. The outputs of gates 66 and 68 are termed fast clock signals FC1 and FC2 and are applied to other portions of the system as will be later described. Fast clock signals FC1 and FC2 are 180° out of phase with one another.

The input to gate 66 is also applied to a binary counter 70 which may comprise for instance an SN7493 binary counter. The clock pulses are divided by two by the counter 70 and are applied to a binary counter 72, wherein the signal is again divided to provide an output clock signal of 57.6 KHz for application to a two-stage binary counter 74. Counter 74 continuously divides the clock signal down to 28.8 KHz, 14.4 KHz, 7.2 KHz and 3.6 KHz. The 3.6 KHz signal is applied to the CP terminal of a flipflop 76 and is applied therefrom to a binary counter 78, which may for instance comprise an SN74161 counter.

Counter 78 is a binary multimodulus counter which divides a 3.6 KHz signal by different numbers in order to provide different clock rates. The numbers that the clock signal is divided by are determined by the various inputs to the counter 78 from an inverted 80, NOR gates 82 and 84, and NAND gate 86. A terminal EN50 is connected through inverter 80 to the counter 78. A terminal EN57 is connected through an inverter 88 to inputs of each of the gates 82, 84 and 86. A terminal EN75 is connected through an inverter 90 to inputs of gates 84 and 86. A terminal EN100 is connected directly to an input of gate 86 and is also connected through an inverter 92 to an input of gate 82 and to an input of a NAND gate 94. The output of gate 94 is applied to the flipflop 76.

Terminals EN50, EN57, EN75 and EN100 are programmed by the insertion of a module in the back of the cipher units 10 or 14 in order to select the desired baud rate. The insertable module selectively grounds any one of the four terminals to provide a desired baud rate. For instance, grounding of terminal EN100 will provide a baud rate of 100. The lack of grounding of any of the four terminals constitutes a fifth baud rate of 45 baud. The capability of programming the four terminals of the binary counter 78 allows flexible use of the present ciphering device with teletype machines of different speeds.

The output of the counter 78 is applied via lead 98 and is entitled the CP clock pulse signal. The CP signal will be dependent upon the insertion of the previously described baud rate module. For example, if the terminal EN100 is grounded by the module, the output CP signal has a frequency of 400 cps, while if the EN50 terminal is grounded, the CP output signal will be provided with a frequency of 200 cps.

Figure 4:
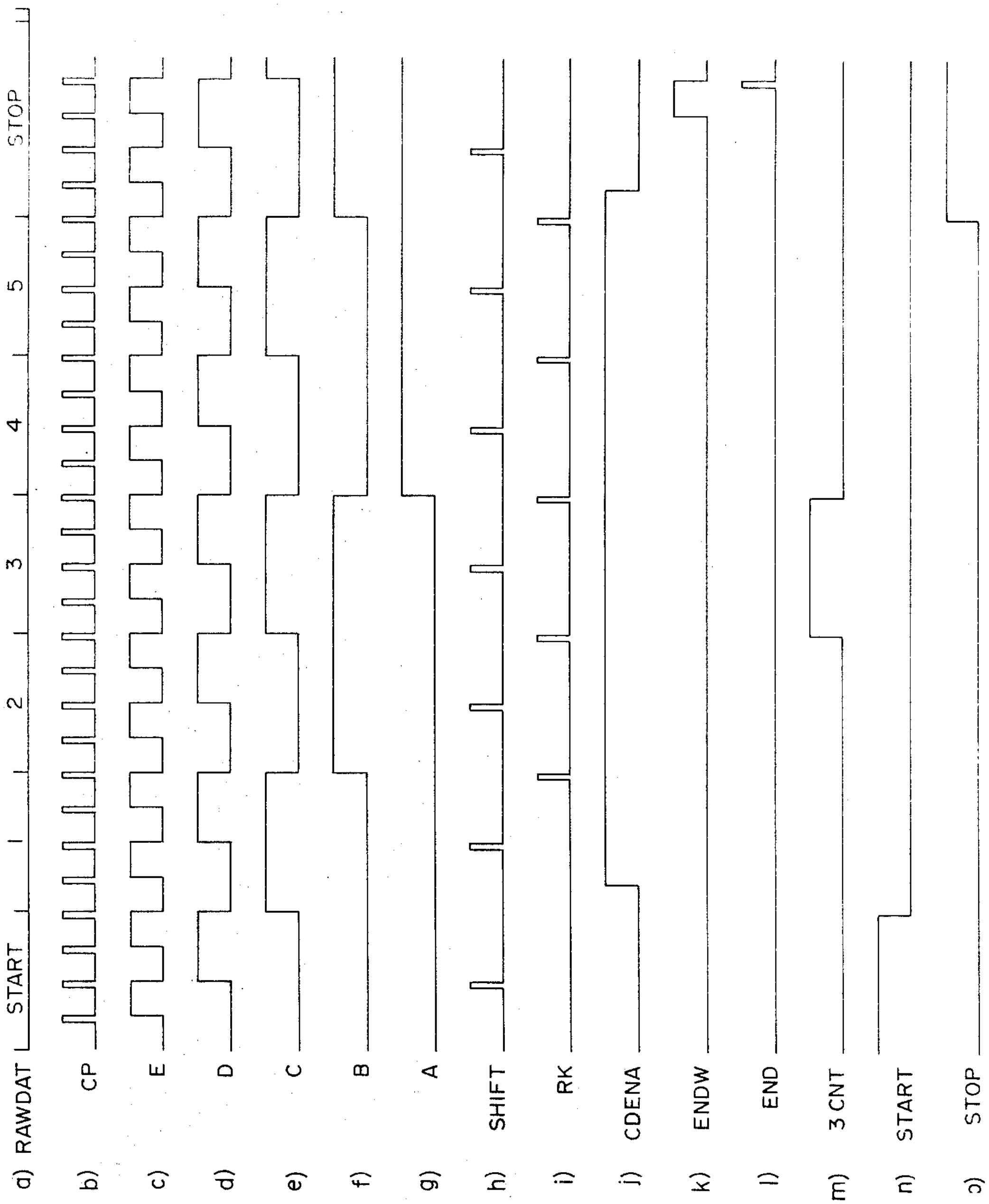
FIGS. 4*a–o* are timing waveforms illustrating the operation of the circuitry shown in FIG. 3.

The CP signal is utilized only in the synchronizer circuit to primarily control the operation of counters 70 and 72. Referring to FIG. 4*b*, the CP signal is illustrated as being a periodic clock pulse. The CP signal is applied to inputs of NAND gates 100 and 102, the outputs of which are applied to a flipflop 104 for generation of the CDENA signal shown in FIG. 4*j*. Additionally, outputs from counters 70 and 72 are applied to the inputs of gates 100 and 102. The outputs from counters 70 and 72 are applied directly and through inverters 106–112 to various inputs of NAND gates 114–124 and to NOR gate 126.

The output of gate 114 comprises the 3CNT signal shown in FIG. 4*m*, while the output of gate 116 comprises the STOP signal shown in FIG. 4*o*. The output of gate 118 is applied through a NOR gate 130 to provide the "SHIFT" signal shown in FIG. 4*h*. The output of gate 120 is applied through a NOR gate 132 which is applied through a NAND gate 134 and an inverter 136 to comprise the RK (Request for Key) signal shown in FIG. 4*i*. The output of gate 130 is connected to a terminal of a monostable multivibrator 138, which may comprise for instance an SN74121 one shot multivibrator. The $\overline{Q}$ terminal of the multivibrator 138 is connected to a second input of the NAND gate 134.

The multivibrator 138, in conjunction with gate 134, is of importance in the present invention in that it acts as a "speed trap" to increase the security of the cipher system. The speed trap prevents the data output rate of the system from being deliberately increased during efforts to break down the internal code of the cipher system. For example, with the output data rate of the cipher system, it is estimated that it would take a data thief a large number of years, even with the use of a high speed digital computer, to mathematically break the internal code setting of the present cipher system. However, if it were possible for a data thief to substitute a high frequency crystal for crystal 62 and thereby materially increase the output rate of the present system, a large amount of data could be "dumped" into a high speed digital computer and the internal code of the present cipher system might be more quickly broken.

However, with the use of the monostable multivibrator 138 and the NAND gate 134, if the baud rate of the present cipher system is increased more than about twice the normal legal baud rate, the code generator 44 will stop operation and the system will go into an alarm state. The operation of the multivibrator circuit will become apparent from an inspection of the timing waveforms shown in FIG. 4. Since the shift clock pulse is dependent upon the oscillator clock 60, if the clock rate is more than doubled, the monostable multivibrator 138 will be continuously fired and thus an RK signal will not be generated from the NAND gate 134. If the code generator 44 does not receive an RK signal, no key bit is generated to the key cipher circuitry 42. After elimination of five such key characters, the code generator 44 will terminate operation and sequence detector 50 will subsequently sense an alarm and place the circuit in an alarm state.

The output of gate 126 comprises the ENDW signal shown in FIG. 4*k*, while the output of gate 122 comprises the END pulse shown in FIG. 41 to denote the ending of a data word. The output of gate 124 comprises the "START" signal shown in FIG. 4*n* to note the start of a data word. The various outputs from the counters 70 and 72 are termed A–E and are illustrated in FIGS. 4*c–g*.

The raw data or a RAWDAT signal is shown in FIG. 4*a* and is applied through a NAND gate 140 into a flipflop 142, as well as to an input of a NAND gate 144. The various inputs of a NAND gate 144 are interconnected with various inputs of the gates 114–124 and also receive the output from counters 70 and 72. The flipflop 142 is set when the raw data "START" pulse occurs and resets when the "END" pulse occurs. The output from the Q terminal of the flipflop 142 operates to turn each of the counters shown in FIG. 3 on and off. Gate 144 eliminates false starting of the system due to the occurence of transients.

THE KEY CIPHER CIRCUIT

Figure 5:
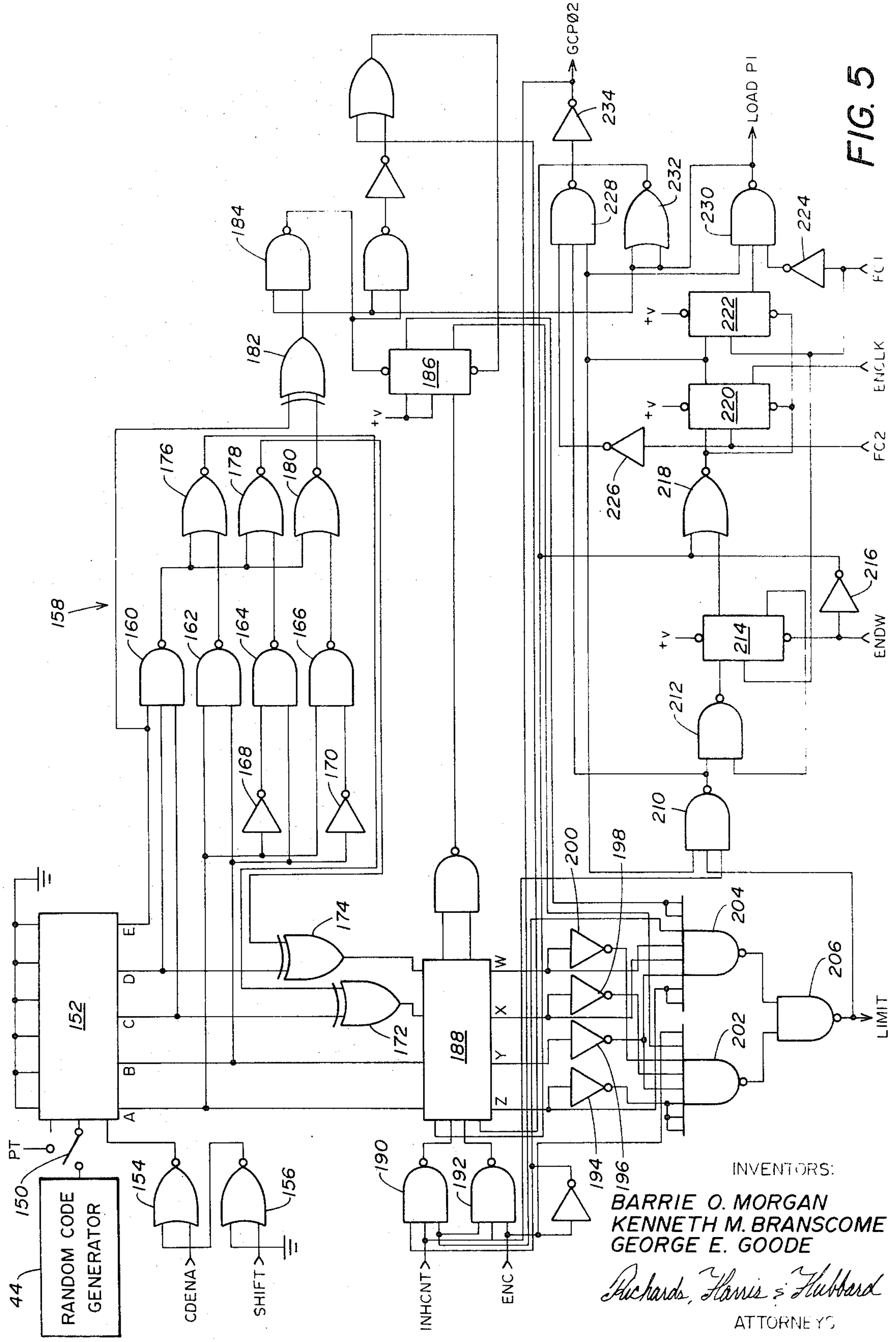
FIG. 5 is a schematic diagram of the key cipher circuitry of the invention.

FIG. 5 illustrates the random code generator 44 and its interconnection with the key cipher circuitry 42. The random code generator 44 may comprise any suitable source of pseudorandom key bits. For example, the random code generator 44 may comprise a plurality of interconnected non-linear feedback shift registers. It is known that long cycles from such shift registers will present a pseudorandom pattern.

In order to enable synchronization between encode and decode stations, the feedback shift registers are generally provided with start information commonly termed "PRIME." The "PRIME" start information is in the form of a number of characters which may be manually selected at random by the operator of the system by the use of external pinboards or the like. The "PRIME" information then determines the starting point of the shift registers, after which the registers are shifted and added together modulo-2 to provide a pseudorandom stream of bits which is applied to the key cipher circuitry. For further explanation of such a pseudorandom code generator, reference is made to U. S. Pat. No. 3,522,374, issued July 28, 1970, to Abrahamsen et al.

The random code generator 44 may also comprise any other type of conventional pseudorandom code generator which provides the required pseudorandom key bit stream. For a description of another random code generator which provides, among other features, automatic random generation of "PRIME" data, reference is made to the copending patent application entitled Random Digital Code Generator, Ser. No. 134,320, filed Apr. 15, 1971, by George E. Goode and Kenneth M. Branscome; and assigned to the present assignee.

The output of the random code generator 44 is applied through a mechanical switch arm 150 to a key register 152, which may comprise for instance, an SN7496 register. Mechanical switch arm 150 may also be switched to a PT terminal for application of diagnostic information to enable self diagnosis of the cipher system. However, in normal operations, the switch arm 150 will be switched to feed the pseudorandom key bit stream from the random code generator to the register 152. The output from the generator 44 is clocked into register 152 under the control of a NOR gate 154. Gate 154 is controlled by the CDENA signal and the NOR gate 156 which is controlled by the SHIFT signal. In the preferred embodiment, five shift pulses are thus provided for each data word.

Each key word supplied by the random code generator 44 will thus have 32 possible combinations. The key cipher circuitry shown in FIG. 5 thus converts the 32 combinations into the binary equivalent thereof. However, due to the fact that teleprinter systems have forbidden words which must not be transmitted, the conversion circuitry 158 is provided which forces the output from the random code generator into a group of 29 binary numbers. Circuitry 158 thus omits three possibilities from the random code generator by converting each of the three possibilities into one of the allowable 29 binary words.

The conversion circuit 158 comprises NAND gates 160–166, inverters 168 and 170, exclusive OR gates 172 and 174 and NOR gates 176–180. The output of gate 180 and an output of the register 152 are applied through an exclusive OR gate 182 and a NAND gate 184 to a flipflop 186. The flipflop 186 is a part of a synchronous binary up-down counter 188 which is connected to receive the output of the register 152. The INHCNT and ENC signals, to be subsequently described, are applied through NAND gates 190 and 192 to control the operation of the counter 188 and the flipflop 186. Counter 188 is loaded by the contents of the key register 152. The circuitry 158 converts any of the three forbidden words into acceptable characters for loading to the counter 188 and the flipflop 186.

The outputs of the counter 188 are applied through inverters 194–200 to the inputs of NAND gates 202 and 204. The outputs of gates 202 and 204 are combined in a NAND gate 206 to generate a limit signal. This limit signal indicates that the counter 188 has reached its limit in counting down in case of the encoding mode, or in counting up when in the decoding mode. The inhibit count signal INHCNT which is applied to gate 190 inhibits the counter 188 from counting when a forbidden word is detected by the data cipher circuitry 46, thereby effectively causing the counter to make one more cycle to prevent the generation of a forbidden word.

The INHCNT signal, along with the limit signal, is applied through a NAND gate 210 and a NAND gate 212 to a flipflop 214. The ENDW signal is applied through an inverter 216 to an input of a NOR gate 218, the second input of which is connected to the Q terminal of the flipflop 214. Gate 218 is connected to flipflops 220 and 222. The fast clock signals FC1 and FC2 are applied through inverters 224 and 226 to NAND gates 228 and 230. The output of gate 230 provides the LOAD P1 signal and is applied to a NOR gate 232 for control of the counter 188. The output of gate 228 is applied through an inverter 234 to provide the GCPO2, which is applied to an input of gate 190. The Q output of flipflop 220 generates the ENCLK signal which is utilized to activate and control counters on the data cipher circuit 46.

THE DATA CIPHER CIRCUIT

Figure 6:
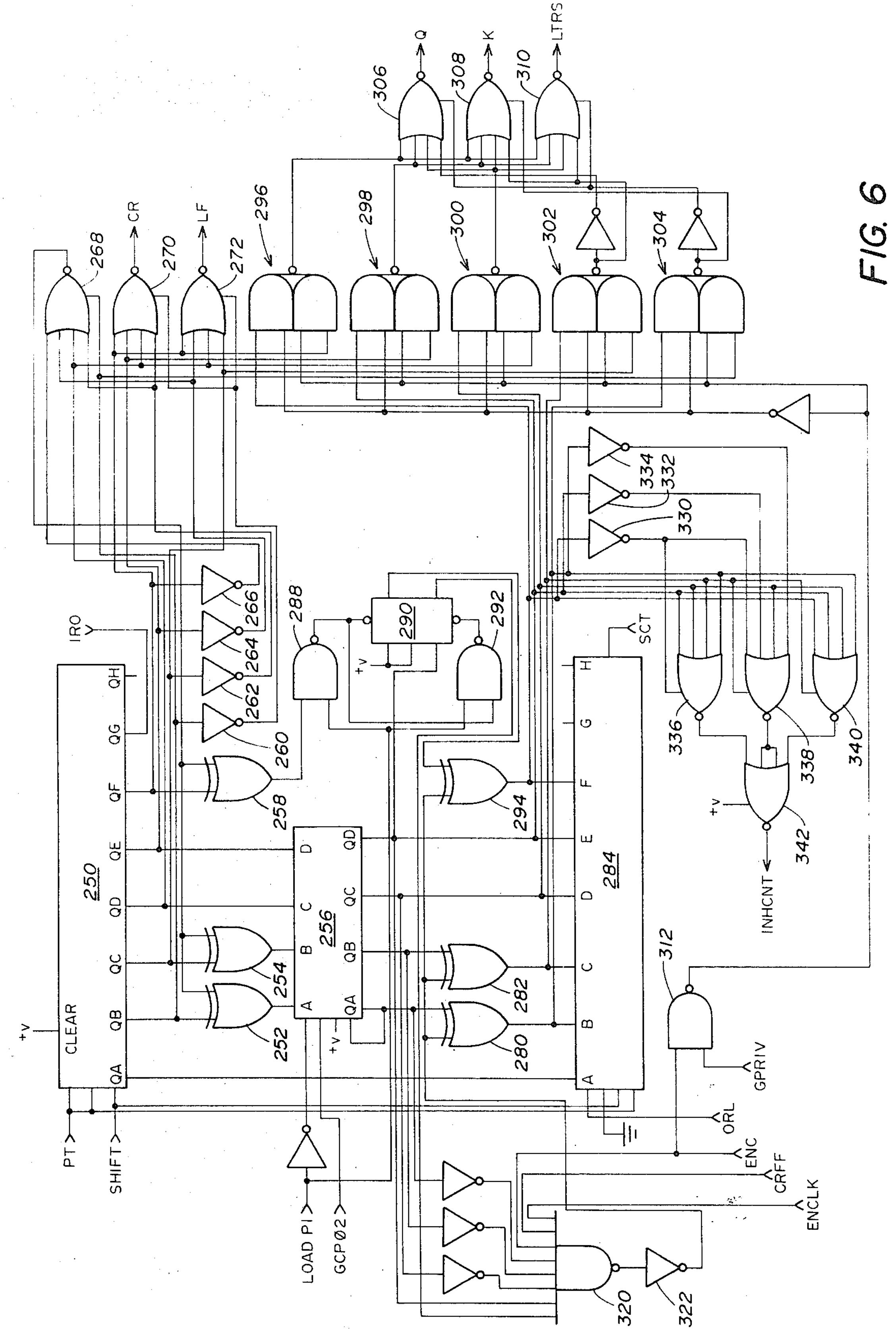
FIG. 6 is a schematic diagram of the data cipher circuitry of the invention.

FIG. 6 illustrates the data cipher circuitry 46 in detail. The plain text (PT) data is applied to a shift register 250. The outputs of the register 250 are applied directly through exclusive OR gates 252 and 254 to a nonlinear cyclic sequential stepping circuit, which in the preferred embodiment comprises a binary synchronous counter 256. The nonlinear cyclic sequential stepping circuit of the invention may comprise any stepping circuit which does not utilize a linear combination of adders, memory devices or constant multipliers for the generation of cyclic digital outputs. Linear circuitry such as shift registers and the like generate linear outputs more predictable and therefore less secure from mathematical breakdown than the nonlinear circuit of the invention. It is within the purview of the present invention to utilize other nonlinear circuitry than a binary counter, such as a specific "hard-wired" circuit for the generation of digital outputs according to a predetermined nonlinear code.

The remaining outputs from register 250 are applied through an exclusive OR gate 258 and inverters 260–266 to the inputs of NOR gates 268–272. The gate 268 detects whether or not a Figures character is present in the register 250. If so, exclusive OR gates 252, 254 and 258 convert the Figures character into a Line Feed Signal. This procedure is provided so that a Figures signal is not transmitted over the Telex line, as it is a forbidden character.

The binary synchronous counter 256 accepts all data from the register 250. In operation, a word is dumped into the counter 256 and the counter is clocked by the GCPO2 signal until the limit signal applied from the key cipher circuitry 42 has been reached. The resulting character is then shifted from the counter 256 directly through exclusive OR gates 280 and 282 to an eight bit shift register 284.

The SCT signal is taken from a terminal of the register 284. The output of the exclusive OR gate 258 is applied through a NAND gate 288, the output of which is applied to a flipflop 290 and to the input of a NAND gate 292. Flip-flop 290 is a portion of a 5-stage counter including counter 256. The output of the flipflop 290 is applied through an exclusive OR gate 294 to the register 284. The outputs of the counter 256 and gates 280, 282, and 294 are applied to gates 296–304, the outputs of which are applied to NOR gates 306–310. Gates 296–304 provide a selection under signal GPRIV which is applied through a NAND gate 312. The GPRIV signal enables selection between register 250 and counter 256 in response to the particular mode of operation of the system, When encoding, the data contained in register 250 is plain text, while the data contained in the counter 256 is cipher text. When decoding, the opposite is true. Gates 306–310 detect the various characters Q, K, and LTRS in order to determine whether to operate in clear or private. These characters are entered into the system through the teleprinter keyboard by the operator as previously noted.

The output of the counter 256 is applied to various inputs of a NAND gate 320, the output of which is connected via an inverter 322 to the exclusive OR gates 280, 282 and 294. Gate 320 detects the presence of a Line Feed signal in the cipher text generated from the counter 256. Upon the occurrence of a Line Feed signal from the counter 256, if the Line Feed signal is not preceded by a Carriage Return signal as is indicated by the CRFF signal applied to the gate 320, the output data from the counter 256 is modified into a Figures character. The modification is accomplished by the exclusive OR gates 280, 282 and 294.

The outputs from the counter 256 and from the gates 280, 282 and 294 are applied directly via inverters 330–334 to the inputs of NOR gates 336–340. The outputs of gates 336–340 are applied through a NOR gate 342 to generate the INHCNT signal for application to gate 190 in FIG. 5. The INHCNT signal inhibits counting upon the occurrence of a forbidden character in the ciphered output of the system, thus effectively causing the counter to count one more step to thereby prevent the generation of a forbidden word. An important aspect of this portion of the circuitry is that additional forbidden words may be easily included in the system by merely adding additional logic gates at this portion of the system.

In operation of the data cipher circuitry 46 shown in FIG. 6, the clear text data is input into the register 250, the data being modified in case it comprises a forbidden Figures character. The data is then shifted down into the binary counter 256, wherein the data is ciphered and shifted down into the output register 284. The counter 256 ciphers the data under the control of the gated clock pulse GCPO2 which determines how many counts the counter takes.

In order to best understand the ciphering technique utilized by the present invention, reference is made to the following Table I, wherein 32 possible combinations of a five level digital codes are listed under the heading "Digital Words."

TABLE I

| Digital Words | | Forbidden Characters | Teleprinter Key Characters |
|---|---|---|---|
| 1. | 00000 | X | NULL |
| 2. | 10000 | | T |
| 3. | 01000 | X | CR |
| 4. | 11000 | | O |
| 5. | 00100 | | SPACE |
| 6. | 10100 | | H |
| 7. | 01100 | | N |
| 8. | 11100 | | M |
| 9. | 00010 | | LF |
| 10. | 10010 | | L |
| 11. | 01010 | | R |
| 12. | 11010 | | G |
| 13. | 00110 | | I |
| 14. | 10110 | | P |
| 15. | 01110 | | C |
| 16. | 11110 | | V |
| 17. | 00001 | | E |
| 18. | 10001 | | Z |
| 19. | 01001 | | D |
| 20. | 11001 | | B |

| | | | |
|---|---|---|---|
| 21. | 00101 | | S |
| 22. | 10101 | | Y |
| 23. | 01101 | | F |
| 24. | 11101 | | X |
| 25. | 00011 | | A |
| 26. | 10011 | | W |
| 27. | 01011 | | J |
| 28. | 11011 | X | FIGS |
| 29. | 00111 | | U |
| 30. | 10111 | | Q |
| 31. | 01111 | | K |
| 32. | 11111 | | LTRS |

The corresponding Teleprinter Key Character which causes the particular digital word to be generated upon depression of a particular teleprinter is listed opposite each of the Digital Words. The letter X indicates that the teleprinter key characters NULL, Carriage Return (CR) and Figures (Figs) are forbidden and are thus not to be loaded into the register 284. If the FIGS. character is fed into the register 250, the conversion circuitry changes it into a LF signal. If the counter 256 generates a cipher comprising a forbidden word, the counter is cycled one extra count to eliminate the transmission of the forbidden word.

Utilizing a specific example of the operation of the circuitry shown in FIG. 6, assume that the teleprinter key H has been depressed and thus the digital word 10100 has been entered into the register 250. Further, assume that the random key cipher signal which has been determined by the key cipher circuitry 42 is 00100. As the key cipher signal corresponds to a binary four, the data entered into the binary counter 256 is stepped through four steps by the resulting GCPO2 limit signal. Thus, the counter 256 is stepped four steps and the tenth digital word shown in Table I, or 10010, is output from counter 256 through gates 280, 282 and 294 to register 284. The character L is thus output from the register 284 as the ciphered character. On the next data cycle, the raw text word is shifted into the binary counter 256 and the counter is again shifted in the random manner according to the GCPO2 limit signal.

If the ciphering device is in the decode or deciphering mode, the system is synchronized with the remote encoding system. The enciphered character is shifted into the register 250 and the key cipher circuitry 42 generates a GCPO2 signal which controls the operation of the binary counter 256. As the random code generators of both the encode and decode mode machines are synchronized, the GCPO2 limit signal applied to the deciphering counter 256 would be, using the previous example, the 29 complement of binary 4 which is binary 25. Beginning at level 10 shown in Table I and counting 25, while skipping over the forbidden characters, the level 6, or 10100, is indicated. This digital word is loaded into register 284 from the counter 256 and is thus output to indicate that the teleprinter and key character H had initially been depressed at the encoding station. The inhibit INHCNT signal is generated during the decoding mode to prevent counting of the forbidden characters.

THE DATA SWITCHING AND CONTROL

Figure 7:
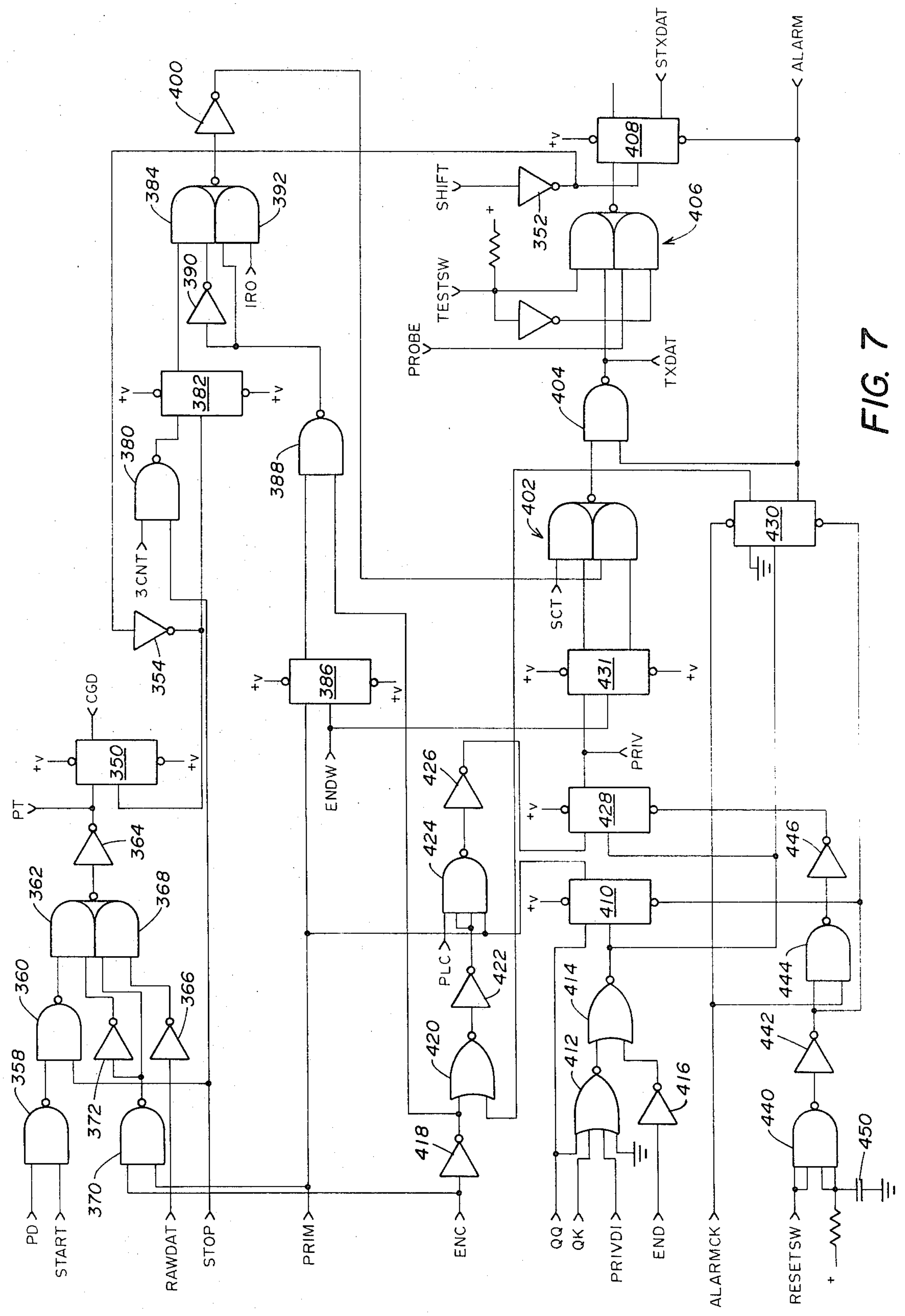
FIG. 7 is a schematic diagram of the data switching and control circuitry of the invention.

Referring to FIG. 7, the data switching control circuitry is illustrated. The plain text (PT) signal is applied to flipflop 350 which is synchronized with the shift pulse signal applied through inverters 352 and 354 to the CP terminal of the flipflop 350. The output from the flipflop 350 is a code generator data signal (CGD) which supplies the random code generator 44 with priming data. Priming data (PD) and start data applied through a NAND gate 358 and through NAND gates 360 and 362 and through an inverter 364 to a flipflop 350. The raw data (RAWDAT) signal is applied through an inverter 366 and through a NAND gate 368 to the inverter 364. The encode (ENC) signal is applied through a NAND gate 370 and through an inverter 372 to the gates 362 and 368. The priming signal (PRIM) is also applied to an input of gate 370. Circuitry comprising gates 358–370 operates to provide data selection between raw data and priming data coming from the code generator, depending upon which mode of operation has been selected from the cipher unit.

The STOP and 3CNT signals are applied through a NAND gate 380 to a flipflop 382, the Q terminal which is connected to an AND gate 384. Gate 380 and flipflop 382 operate to provide the generation of a Space character signal which is used to generate spaces by the teleprinter during the Receive Prime operation of the system. When priming information is being fed into the random code generator, the priming characters are suppressed and the spaces are inserted in lieu of the priming data by the flipflop 382.

The PRIM signal is applied to a flipflop 386, the Q terminal which is connected through a NAND gate 388 and through an inverter 390 to gate 384. The output of gate 388 is also connected directly to an AND gate 392. Gates 384 and 392 operate to select between the space generator flipflop 382 and the output of the input data register 250 shown in FIG. 6. The selection of the AND gates 384 and 392 again depends upon the mode of operation of the system.

The output of gates 384 and 392 are connected through an inverter 400 to an input of an AOI gate 402. The SCT signal, previously noted is also applied to the gate 402. The output of gate 402 is applied through a NAND gate 404 which is connected to the input of an AOI gate 406. The output of gate 406 is applied to a flipflop 408, the CP terminal of which is connected to the inverter 352. A probe terminal is attached to an input of gate 406, as is a Test Switch Terminal. The test circuit enables self-diagnosis of the present system by placing a probe on various terminals desired to be analyzed, and thereby having the teleprinter print out the particular data points.

The flipflop 408 is a synchronizing flipflop to select the selected data from gate 406 to apply the data to the printer by the signal STXDAT to cause the printer to print. The clear terminal of flipflop 408 is connected to receive an alarm signal to inhibit all data in case of an alarm. In case of an alarm, as will be later described, no data may be output from the system.

The QQ signal is directly applied to a flipflop 410, the QK and the PRIVD1 signals are applied through NOR gates 412 and 414 to the flipflop 410. The END signal is applied through an inverter 416 to the gate 414. The ENC signal is applied through an inverter 418 to an input of an OR gate 420, the output of which is applied through an inverter 422 to an input of a NAND gate 424. The gate 424 receives the PLC signal and applies an output through an inverter 426 to a flipflop 428. The output of gate 414 is also applied to a flipflop 430, which receives the ALARMCK signal. The ENDW signal is applied to a flipflop 431, which is connected to the Q terminal of flipflop 428 which generates the PRIV signal. The Q and $\bar{Q}$ outputs of flipflop 431 are applied to the AOI gate 402.

Flipflops 410, 428 and 430 determine the mode of operation of the device. Flipflop 410 places the system in the Prime mode, while flipflop 428 places the system in the Private mode. Flipflop 430 places the system in the Alarm state. Flipflops 410 and 428 are primarily controlled by gate 414 only when a transition is indicated from one operation state to another.

A RESETSW signal is applied through a NAND gate 440 and an inverter 442 to an input of a NAND gate 444. Gate 444 also receives the ALARMCK signal. The output of gate 444 is applied through an inverter 446 to the flipflop 428, while the output of the inverter 442 is applied to the flipflop 410. Operation of gate 440 is controlled by a capacitor 450 which stores voltage upon initial application of power to the circuit. When approximately 1.7 volts is sensed on the capacitor 450, gate 440 is fired to provide a signal which removes an initial reset on all of the flipflops 410, 428 and 430. A manual switch may also be operated at the terminal to reset the circuitry.

THE SEQUENCE AND ALARM DETECTOR

Figures 8, 9:
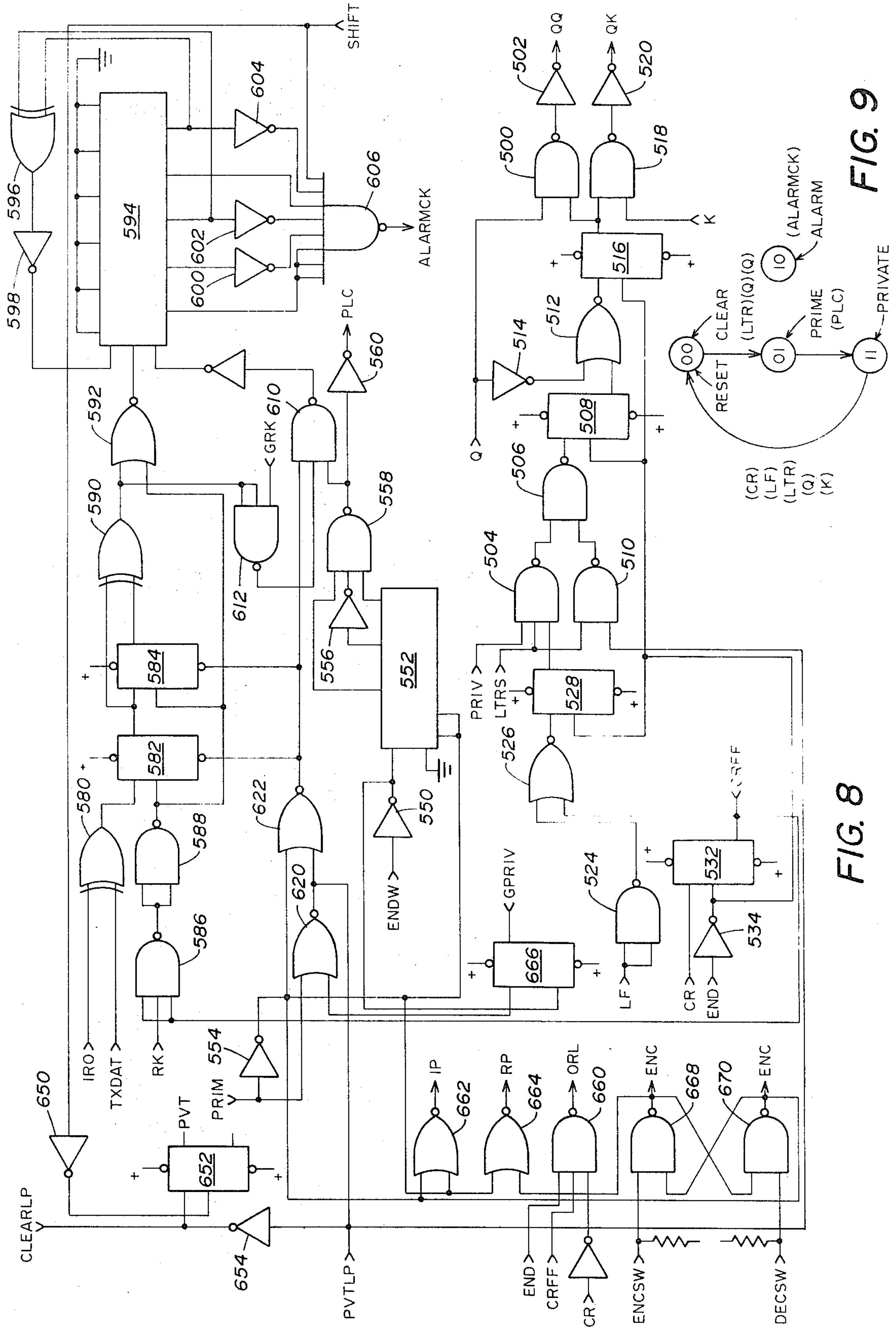
FIG. 8 is a schematic diagram illustrating the sequence detector and checking circuitry of the invention.
FIG. 9 is a flow diagram illustrating the various modes of operation of the present system.

FIG. 8 illustrates the sequence detector of the invention. The signal Q is derived from gate 306 shown in FIG. 6 and is applied through a NAND gate 500 and an inverter 502 to generate the signal QQ. The PRIV signal is applied through a NAND gate 504, which also receives the LTRS signal. The output of gate 504 is connected through a NAND gate 506 to a flipflop 508. The LTRS signal is also applied through a NAND gate 510 which is connected to an input of gate 506.

The output of flipflop 508 is connected through a NOR gate 512, which also receives the Q signal via an inverter 514. Output of gate 512 is applied to a flipflop 516, the output of which is applied to gate 500 and also to a NAND gate 518. The output of gate 518 is provided via an inverter 520 as the QK signal. The Line Feed (LF) signal is supplied through a NAND gate 524 and through a NOR gate 526 to a flipflop 528. The output of flipflop 528 is connected to an input of gate 504. The Carriage Return signal (CR) is applied to a flipflop 532 which also receives the END signal via an inverter 534. Flipflop 532 also generates the CRFF signal previously described. The circuitry just described comprises a character sequence detector.

The flipflops 508, 516, 528 and 532 store the fact that a Carriage Return is present. Subsequently the corresponding flipflop is set only if the previous flipflop has been set when a particular character such as Line Feed (LF) is present in the case of flipflop 528, or Carriage Return (CR) in the case of flipflop 532. This sequential setting operation allows the detection of a sequence of characters such as Carriage Return, Line Feed, Letters, QQ and QK to be detected. This detection of character sequences enables the switching from Private to Clear and vice versa from the keyboard.

FIG. 9 illustrates the various sequences of characters utilized to switch from mode to mode, with the digital states representative of the states of flipflops 410 and 428. In the clear mode designated by the digital state 00, a reset signal must have been received either from the manual reset switch or from the reset circuitry previously described. In order to move from the Clear mode to the Prime mode, the sequence LTR, Q, Q must be detected by the circuitry to provide the Prime mode denoted digitally by 01. In order to move into the Private mode, five characters are required to be detected. These may be any five characters, at the end of which the signal PLC places you in the Private mode denoted digitally as 11, provided the alarm check circuitry has indicated an ALARMCK.

To then move into the Clear mode, the sequence of characters CR, LF, LTR, Q and K must be detected. The alarm state is provided only by the alarm check (ALARMCK) signal.

Again referring to the circuitry shown in FIG. 8, the ENDW signal is applied through an inverter 550 to a counter 552. The PRIM signal is applied through an inverter 554 to the counter 552. Counter 552 detects the fifth character in the priming sequence after any arbitrary five priming characters are generated by the key generator, or by any other suitable random manual operation desired. Detection of the fifth character in the priming sequence generates the PLC signal via an inverter 556, a gate 558 and an inverter 560. The PLC signal initiates the Private mode.

An important aspect of the present system is the alarm check circuitry shown in FIG. 8. It is evident from the previous description that the malfunction of the random code generator or other portion of the circuitry could result in transmission from the encoding machine of clear text when the machine is in a Private mode. For security purposes, it is imperative that circuitry be provided to prevent such clear text from being transmitted when the machine is in the Private mode.

As exclusive OR gate 580 receives the IRO and TXDAT signals and is connected to a flipflop 582. The IRO data is derived from register 250 shown in FIG. 6 and is clear text when in the Encode mode. The TXDAT data is the transmitted cipher data. Gate 580 compares the IRO and TXDAT and controls the operation of flipflop 582 in response thereto. Flipflop 582 is connected to a flipflop 584. The RK (Request for Key) signal is applied through NAND gates 586 and 588 to the flipflop 582. The Q terminals of flipflops 582 and 584 are applied through an exclusive OR gate 590 and through a NOR gate 592 to a shift register generator 594. An exclusive OR gate 596 and an inverter 598 are tied around the shift register generator 594 in a conventional manner. The shift register generator 594 outputs are connected directly and through inverters 600, 602 and 604 to gate 606 which generates an ALARMCK signal. The alarm circuitry continuously compares the clear text data with the transmitted cipher data when in the Private mode. Gate 590 compares the outputs of flipflops 582 and 584 to generate an indication when sequential bits are identical. When two identical bits are present, the shift register is clocked through gate 592. The output of the exclusive OR gate 590 which determines the sequential identical bits is applied through a NAND gate 612 which also receives the GRK signal. The output of gate 612 controls the operation of gate 610.

After 25 consecutive clocks, an alarm check (CK) signal is generated from the gate 606 if the IRO and TXDAT signals are identical during those 25 consecutive bits. Whenever the IRO and TXDAT inputs differ, a reset is generated and the shift register generator 594 is cleared and the checking technique begins again.

The PRIM signal is applied through a NOR gate 620 and a NOR gate 622 to an input of the NAND gate 610. Additionally, the PVTLP signal is generated by gate 620.

An important aspect of the invention is that in order to check the alarm circuitry before allowing the present system to transmit cipher data, the IRO and TXDAT signals are forced to be equal by the check circuitry for 25 bits. After the 25 bits, the gate 606 generates the ALARMCK signal which indicates that the alarm check circuitry is functioning properly. The ALARMCK signal is required as well as the PLC signal in order to go into private mode. In case of malfunction of the alarm check circuitry, the system would not be allowed to be operated in the Encode state.

The shift signal is applied through an inverter 650 to a flipflop 652. The CLEARLP signal terminal is connected to the flipflop 652. The PVTLP signal is applied through an inverter 654 to flipflop 652. The Q side of flipflop 652 generates the PVT signal which denotes to the code generator that the system is in the private mode. The END, CRFF, and CR signals are applied to an input of a NAND gate 660 which generates the ORL signal. This allows the Carriage Return signal (CR) to be transmitted in the clear.

A NOR gate 662 is connected to the inverter 554 to receive a PRIM signal to indicate the state of the machine and to generate the initiate prime (IP) signal. A NOR gate 664 is interconnected with gate 662 to generate the receive prime (RP) signal to further indicate the state of the machine. Flipflop 666 generates the GPRIV signal to provide a one character delayed indication of operation of the circuit in the private mode. The delayed indication is necessary since the data is buffered one character during operation of the machine.

NAND gates 668 and 670 are connected in a latch configuration and receive the ENCSW and DECSW signals, respectively. These signals are generated in response to the front panel control switches to provide Decode or Encode mode operation. The circuit NAND gates 368 and 370 are latched at a constant level output, as the pushbutton panel switches are momentary type switches.

It will thus be apparent that the present invention is directed to a cipher system which is extremely practical for use in a wide variety of industrial and commercial environments. While the present invention has been described particularly for use with a five level Telex system, it will be apparent that upon modification of the circuitry, the system could be utilized with eight or other level digital systems. The present system contains circuitry to eliminate generation of forbidden characters, and is readily adaptable to use with a wide variety of teleprinter and other transmitting devices.

The circuitry may be controlled from the keyboard of a conventional teleprinter to operate in either Clear or Private and messages may be sent with combined Clear and Private mode operation, if desired. The code for the day is easily set into the present invention, and the present system provides a large degree of randomization which provides an extremely secure system. The present system utilizes an automatic error check system which prevents transmission of clear text when in the private mode. The present system may not be utilized in the Encode mode in case of a malfunction of the alarm circuit. Preventative circuitry is also provided with the present invention to prevent an intruder from substantially increasing the clock rate of the invention in order to more easily break the machine code with the use of high speed computers and the like.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A code system comprising:
means for receiving a first digital word,
means for generating a randomized digital signal,
means for generating a limit signal in response to said randomized digital signal, and
a nonlinear cyclic sequential stepping circuit for receiving said first digital word and for clocking said word a number of steps determined by said limit signal to generate a second digital word, wherein said second digital word is not defined by a linear recurrence function to thereby enhance the security of the code system.

2. The code system of claim 1 wherein said first digital word comprises clear text and said second digital word comprises enciphered text.

3. The code system of claim 1 wherein said first digital word comprises enciphered text and said second digital word comprises clear text.

4. The code system of claim 1 and further comprising:
an alarm circuit for generating an alarm indication when said first and second digital words correspond over a predetermined interval.

5. The code system of claim 4 and further comprising:
means for preventing operation of said code system until the operation of said alarm circuit is checked.

6. The code system of claim 1 and further comprising:
means for inhibiting generation of said randomized digital signal when said code system is operated at a rate above a predetermined clock rate, to thereby prevent unauthorized breakdown of said code system with the use of high speed analyzation systems.

7. The code system of claim 1 and further comprising:
means responsive to predetermined digital words to initiate or inhibit enciphering operation of said system.

8. The code system of claim 1 and further comprising:
means for preventing the generation of a predetermined forbidden digital word.

9. The code system of claim 1 wherein said nonlinear stepping circuit comprises a synchronous binary counter.

10. An enciphering system comprising:
means for enciphering clear text digital signals into cipher text digital signals,
means for comparing said clear text digital signals with said cipher text digital signals,
means for generating an alarm indication upon correspondence of said clear text and cipher text for a predetermined number of signals,
circuitry for selectively initiating the operation of said enciphering means, and
means for inhibiting said initiating circuitry until said alarm indication is generated in order to check the operation of said alarm generation means.

11. The enciphering system of claim 10 wherein said generating means includes means for counting.

12. The enciphering system of claim 10 wherein said inhibiting means comprises circuitry for forcing said clear text and cipher text digital signals into correspondence for a predetermined interval after actuation of said initiating means.

13. A cipher system having breakdown prevention circuitry comprising:

synchronizer means for generating clock signals,
said synchronizer means generating a periodic shift signal for shifting between each digital signal and further generating a request for key signal in synchronism with said shift signal during a data word,
a monostable circuit responsive to said shift signal for gating said request for key signal,
means operable in synchronism with said clock signals for ciphering digital signals, and
circuitry for inhibiting the operation of said ciphering means when the frequency of said clock signals is increased beyond a predetermined magnitude.

14. A cipher system comprising:

encoding means for receiving a clear text digital word,
means for generating a first random digital signal,
a first nonlinear cyclic sequential stepping circuit for receiving said clear text word and for cycling said word for a number of steps determined by said random digital signal,
means for detecting the output of said nonlinear stepping circuit and for stepping said nonlinear stepping circuit an additional step upon the detection of a predetermined forbidden word,
decoding means for receiving the output of said first nonlinear cyclic sequential stepping circuit,
means for generating a second random digital signal corresponding to said first random digital signal, and
a second nonlinear cyclic sequential stepping circuit operable to receive a ciphered text digital word from said decoding means and for cycling said word for a number of steps determined by said second random digital signal to thereby generate said clear text digital word.

15. The cipher system of claim 14 wherein said first and second nonlinear cyclic sequential stepping circuit comprise a binary counter.

16. The method of generating ciphered data comprising:

enciphering clear text digital bits into cipher text digital bits,
comparing said clear text digital bits with said cipher text digital bits,
generating an alarm indication upon correspondence of said clear text and cipher text for a predetermined number of bits,
forcing the generation of said alarm indication upon initial enciphering operations, and
inhibiting the generation of cipher text until said alarm indication is generated in order to check the operation of the alarm indication.

17. The method of preventing unauthorized breakdown of generated ciphered data comprising:

generating clock signals,
generating a periodic shift signal and a request for key signal,
gating said request for key signal with said shift signal,
ciphering digital signals in synchronism with said clock signals, and
inhibiting said ciphering operation when the frequency of said clock signals is increased beyond a predetermined magnitude.

18. The method of ciphering comprising:

generating a pseudorandom digital signal,
cycling a clear text digital word through a nonlinear cyclic sequential stepping circuit for a number of steps determined by said pseudorandom digital signal,
monitoring the output of the stepping circuit, and
cycling said stepping circuit an additional step upon the detection of a predetermined digital word at the output of the stepping circuit.

19. The method of claim 18 wherein said clear text digital word is generated from a teleprinter system, and further comprising:

when said clear text digital word comprises the teleprinter FIGURES word, transforming said FIGURES word into a LINE FEED digital word, and
cycling said LINE FEED digital word through said stepping circuit to encipher said digital word.

20. The method of claim 19 and further comprising:

deciphering the enciphered digital word into a LINE FEED digital word,
if the preceding digital word comprises a CARRIAGE RETURN digital word, transforming said LINE FEED digital word into a FIGURES digital word.

21. The method of claim 18 wherein said predetermined digital word comprises:

teleprinter CARRIAGE RETURN, NULL, and FIGURES digital words.

* * * * *

UNITED STATES PATENT OFFICE
CERTIFICATE OF CORRECTION

Patent No. 3,781,472 Dated December 25, 1973

Inventor(s) George E. Goode, et al

It is certified that error appears in the above-identified patent and that said Letters Patent are hereby corrected as shown below:

Col. 5, line 65, "inverted" should be --inventer--;
Col. 7, line 25, "41" should be --4ℓ--;
Col. 9, line 13, "Q" should be --$\overline{Q}$--;
Col. 16, line 34, after "preventing" insert --initial--.

Signed and sealed this 30th day of July 1974.

(SEAL)
Attest:

McCOY M. GIBSON, JR.
Attesting Officer

C. MARSHALL DANN
Commissioner of Patents